Patented June 7, 1932

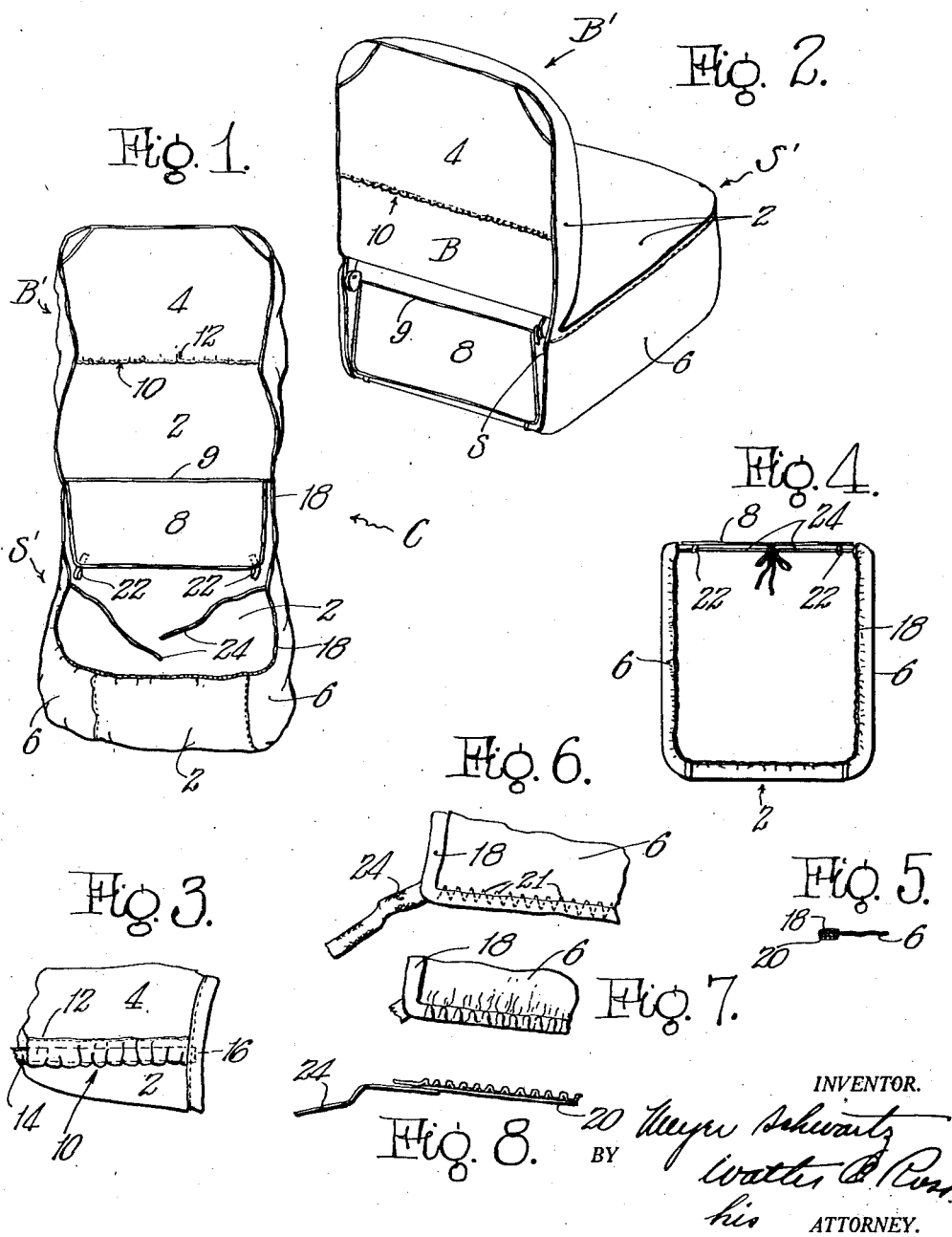

1,861,455

UNITED STATES PATENT OFFICE

MEYER SCHWARTZ, OF SPRINGFIELD, MASSACHUSETTS

SEAT COVER

Application filed January 30, 1930. Serial No. 424,684.

This invention relates to covers for automobile seats and the like.

Automobile seats comprise a seat and a back which are relatively movable. For instance, bucket seats, so-called, consist of a seat having a back hinged thereto, while other seats consist of a back with a seat arranged for tilting movements with respect thereto. It is for seats of this kind that the cover of the invention relates.

Inasmuch as these seats vary in size somewhat, as well as differ in shape, one object of the invention is the provision of a cover which is adapted to adjust itself to seats of various sizes and shapes and has associated therewith tensioning means to cause the cover to snugly embrace the seat.

Another object is the provision of a unitary cover which has a "pocket" part for covering the back and a "pocket" part connected thereto for covering the seat. These are arranged to permit relative movements of the seat and back while means are provided for co-operating with the tensioning means to retain the cover in place.

Various novel features and advantages of the invention will be observed from the description of the preferred form thereof, the same being illustrated by means of the accompanying drawing, in which Fig. 1 is a plan view of a seat cover embodying the features of the invention.

Fig. 2 is a perspective view showing how the cover appears when applied to a seat.

Fig. 3 is an enlarged plan view showing certain details of construction.

Fig. 4 is an inverted plan view of a seat showing the cover applied thereto.

Fig. 5 is a sectional view through the edge of the cover showing details of construction.

Fig. 6 is a plan view of the portion of the cover in distended condition which is made to overlie the side and lower side of a seat.

Fig. 7 is a similar view showing the cover in contracted condition, and

Fig. 8 is a side elevational view of the same.

Referring to the drawing, the invention will now be described in detail.

C represents a cover which comprises in general, an upper portion B' for fitting over the back of a seat B and a portion S' for fitting over a seat S. These are formed as a unitary structure arranged to allow relative movements of the seat and back when in place.

A panel or main body portion 2 is formed to overlie the front and upper portions of the back and seat. At the upper side it has stitched thereto a back panel 4, while side panels 6 are stitched to the lower side and arranged to cover opposite sides of the seat and extend inwardly thereof at the lower side of the seat. In effect the panel 4 and that part of the panel 2 to which it is attached provides a pocket for enclosing the back of the seat while the panels 6 and that portion of the panel 2 to which they are attached form a pocket for enclosing the seat.

A flap 8 stitched along its upper edge 9 to the panel 2 and extending thereacross has its side and lower marginal edges free so that it may extend downwardly between the seat S and back B so as to overlie and cover the rear side of the seat.

It will be readily appreciated that the seats and backs may vary in size and shape. To retain the cover in place and to cause the cover to accommodate itself to various conditions the following is provided.

The lower marginal edge 10 of the panel 4 is doubled upon itself and stitched as at 12 to form a tube in which is located a tension member 14 such as an elastic tape. The tape has its ends secured to the cover at 16 by stitching and is arranged to tension the panel so as to draw the panel 2 smoothly across the rear side of the back B and thereby hold the cover snugly about the back as is desired. When in place the tension member not only draws the cover snugly about the back but tends to prevent the cover from slipping upwardly.

The joined together edges of the panels are preferably bound with tape 18 as are the free edges of the panel. This enhances both the durability and the appearance of the cover.

To draw the portion S' of the cover snugly about the seat S the following is provided, see Figs. 5, 6, 7 and 8. The lower marginal edge of the sections 2 and 6 which are bound with tape as explained are plaited so as to have a fullness and adapted to be extensible. Adjacent the underside of the bound edges of the sections is located a stretchable tape 20 such as rubberized fabric and the tape 20 and plaited taped edge of the sections are stitched together by saw-tooth stitching 21 as is shown clearly in Fig. 6. With this arrangement the tape 20 is adapted to contract the edge of the sections while the tape 18 by being plaited or fulled allows the edge to be extended against the action of the tension tape.

Loops 22 at opposite corners of the flap 8 are adapted to receive and co-operate with tie tapes 24 which have their ends secured to the sections 6 at the ends of the elastic tape 20 for tying the parts.

As the cover is applied to a seat and back, the panels 6 are caused to overlie the sides of the seat, while the marginal extensible edges thereof and of the section 2 are brought inwardly beneath the seat. The tie tapes are brought through the loops and tied together, see Fig. 4. As the tapes 24 and loops are suitably secured the flap 8 is pulled downwardly so as to lie in a flat condition on the rear of the seat while the marginal edges of the panels 6 and lower edge of section 2 are pulled inwardly against the action of tape 20. These edges of the panel 6 and section 2 which are thus stitched or are under tension are held under tension by the tie tapes so that the cover is held in place and snugly embraces the seat.

As will be seen the cover is adapted for use in connection with seats of different sizes and shapes, while it is caused to snugly embrace the same by means of the novel securing means.

What I desire to claim and secure by Letters Patent of the United States is:

1. A seat cover comprising in combination, a main body portion, a panel at the upper end thereof secured at its upper and side edges to the upper and side edges of the main body portion to form a pocket for embracing a back for a seat, side panels at the lower end of said body portion which are secured to said body portion to leave free marginal edges and provide a pocket for embracing a seat, certain of said free marginal edges being plaited and provided with a yieldable tape so as to be extensible and tie means for drawing the certain edges together and extending them under tension whereby a seat may be snugly embraced by the last-named pocket and a flap secured along one edge to said body portion between said pockets for overlying a rear side of a seat and means carried by said flap for co-operating with said tie means whereby the flap may be held against the said rear side of a seat.

2. A seat cover comprising in combination, a main body portion, a rear panel at the upper end thereof having its upper and adjacent side edges secured to upper and adjacent side edges of said body portion with a free edge extending across the body portion and forming with said body portion a pocket having a downwardly directed open mouth whereby the back of a seat may be inserted in the pocket, the said free edge being yieldingly extensible to cause the pocket to snugly embrace a back, side panels secured to opposite sides of the lower end of the panel having free marginal edges and forming a pocket with the body portion for embracing the upper, forward and adjacent sides of a seat, a flap intermediate the ends of said body having an upper edge extending across and secured to the body whereby said flap may extend between a back and a seat and overlie a rear side of a seat, certain free marginal edges of the side panels being yieldingly extensible, tie tapes associated with said panels for extending them and means associated with the flap whereby it is held under tension by the extended edges of the panels.

In testimony whereof I affix my signature.

MEYER SCHWARTZ.